United States Patent [19]

Cutter et al.

[11] 4,415,981
[45] Nov. 15, 1983

[54] MULTI-PURPOSE TERMINAL DEVICE HAVING AN INPUT AND CONTROL KEYBOARD FOR CONNECTION TO A DATA PROCESSING SYSTEM AND/OR TO AN AUTOMATIC TEXT PROCESSING UNIT

[75] Inventors: David Cutter; Hans Unterberger, both of Munich, Fed. Rep. of Germany

[73] Assignee: Siemens Aktiengesellschaft, Berlin & Munich, Fed. Rep. of Germany

[21] Appl. No.: 250,536

[22] Filed: Apr. 3, 1981

[30] Foreign Application Priority Data

May 21, 1980 [DE] Fed. Rep. of Germany ....... 3019480

[51] Int. Cl.³ .............................................. G06F 15/20
[52] U.S. Cl. .................................... 364/518; 358/256; 358/257
[58] Field of Search ............... 364/523, 518; 358/256, 358/257; 355/14

[56] References Cited

U.S. PATENT DOCUMENTS

| | | | |
|---|---|---|---|
| 4,196,450 | 4/1980 | Miller et al. | 364/523 X |
| 4,249,216 | 2/1981 | Kanda | 358/257 |
| 4,255,766 | 3/1981 | Matsuda et al. | 358/257 |
| 4,317,136 | 2/1982 | Keyt et al. | 358/257 X |
| 4,343,036 | 8/1982 | Shimizu et al. | 364/518 |

Primary Examiner—Edward J. Wise
Attorney, Agent, or Firm—Hill, Van Santen, Steadman & Simpson

[57] ABSTRACT

A multi-purpose terminal device is adapted for connection to a data processing system, an automatic text processing unit and/or a communication network. An input and control keyboard is provided for controlling connections and for adding information to the information provided by a plurality of devices. A hard copy input is provided and optically coupled to a hard copy output for producing local copies. A branching device connects the hard copy input to an interface with the external units. A memory is also provided for storing data read from masters, buffering data coming from the external units and for intermediate storage of data during processing operations.

25 Claims, 4 Drawing Figures

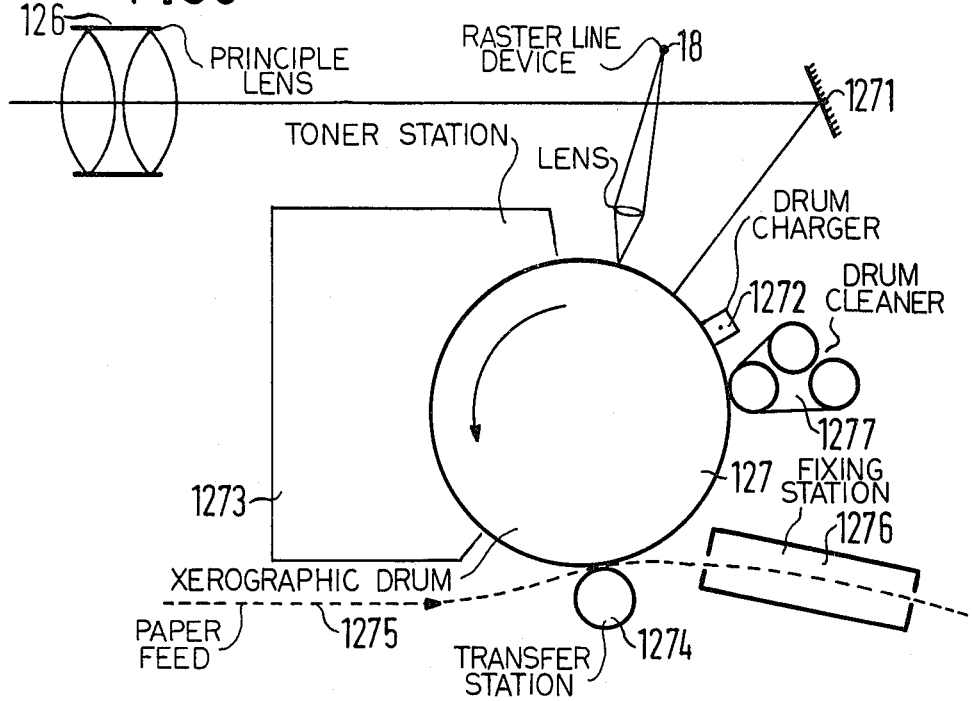
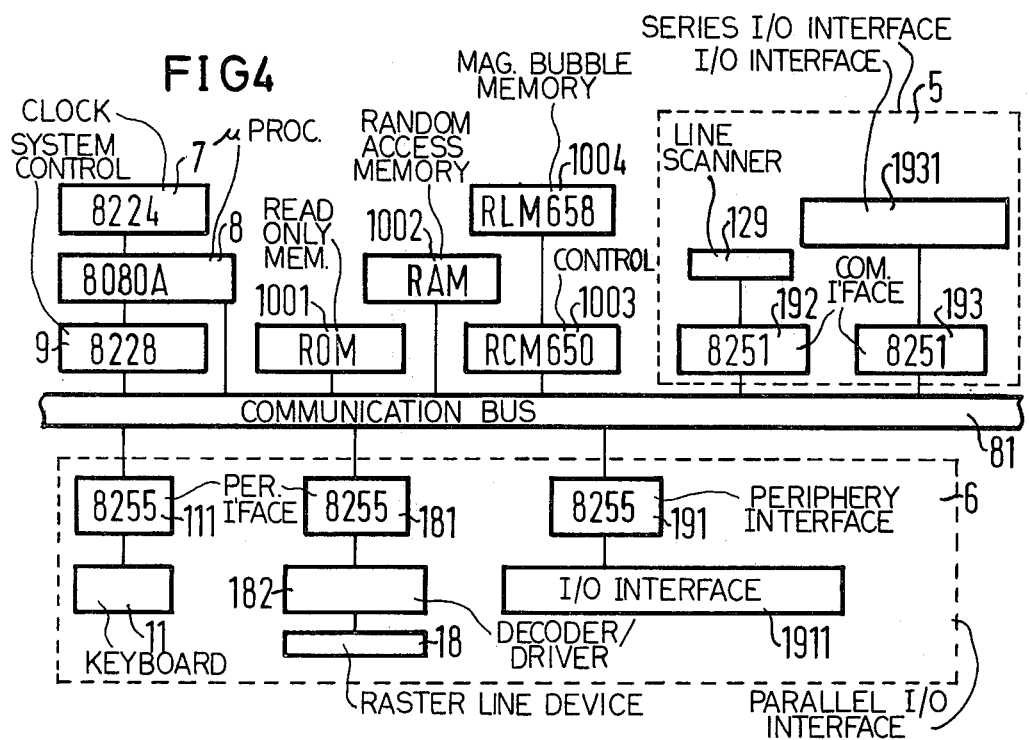

MULTI-PURPOSE TERMINAL DEVICE HAVING AN INPUT AND CONTROL KEYBOARD FOR CONNECTION TO A DATA PROCESSING SYSTEM AND/OR TO AN AUTOMATIC TEXT PROCESSING UNIT

BACKGROUND OF THE INVENTION

1. Field of the Invention

The present invention relates to a multi-purpose terminal device having an input and control keyboard for connection to a data processing system and/or an automatic text processing unit. More specifically, the multi-purpose terminal device represents a structure which essentially serves to produce so-called hard copy documents.

2. Description of the Prior Art

Hard copy output devices are known per se. In such devices, input originals are optically imaged onto a light-sensitive surface located on a drum, the surface, after exposure, successively passing through a toner station and a transfer to paper which, in turn, subsequently traverses a fixing or stoving station. Accordingly, the copies produced are made exclusively in an optical or, respectively, optoelectrostatic manner. For obvious reasons, the cooperation of such known hard copy output devices with, for example, an automatic text processing unit is not possible without further steps.

In the course of constantly increasing office automation, there is a need for a versatile hard copy output device by means of which additional functions beyond the functions of traditional devices, such as telecopying, telexing, plotting, printing, can be fulfilled. In cooperation with an automatic text processing unit, such a device, moreover, would even be in a position to make the processing of text masters or, for example, graphic masters as well, possible to a limited degree.

SUMMARY OF THE INVENTION

The object of the present invention, therefore, is to provide a multi-purpose terminal device which can, as required, fulfill the functions set forth above. In addition, the terminal device shall be able to economically produce so-called local copies of high quality. Mechanical adjustments as in traditional devices, for example, by setting the lenses to one or another operating mode corresponding to one of the functions set forth, should, in terms of the object, likewise not be required. Finally, the multi-purpose terminal device is to have a compact format and be able to be reliably and economically operated.

The above object is achieved, according to the present invention, in a multi-purpose terminal device having an input and control keyboard for connection to a data processing system and/or an automatic text processing unit and is characterized in that there is provided an input device with a hard copy input for inserting an original and with a branching by means of which the optical information existing in the form of the original is relayed both to an output device having a hard copy output for outputting local copies and to a scanning device for further processing or, respectively, transmission of the optical information. There is also provided an interface which can be influenced by the input and control keyboard and which has a control for controlling and monitoring electrical information paths, an input/output interface by way of which the multi-purpose terminal device can also be connected to a communication network in addition to be connected to the data processing system and/or to the automatic text processing unit. Also, a memory is provided for storing the data of scanned masters, for buffering data coming from external devices and for intermediate storage of data during running processing operations.

Function of such differing types of local copying, telecopying, telexing, plotting, printing and, to a limited degree, processing of masters, can advantageously be selectively executed with a multi-purpose terminal device constructed in accordance with the present invention. Advantageously, no mechanical readjustments from operating mode-to-operating mode are required since the changeover according to the design of the terminal device can be undertaken electronically. Moreover, it is further advantageous that a better resolution is achieved by employing imaging lenses and that contamination of the optical surfaces by toner is avoided due to the distance thereof from the drum.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 3 is a schematic representation of apparatus constructed in accordance with the invention; and FIG. 4 is a schematic block diagram of the electronic devices employed in a multi-purpose terminal device constructed in accordance with the invention.

DESCRIPTION OF THE PREFERRED EMBODIMENTS

Figure 1:
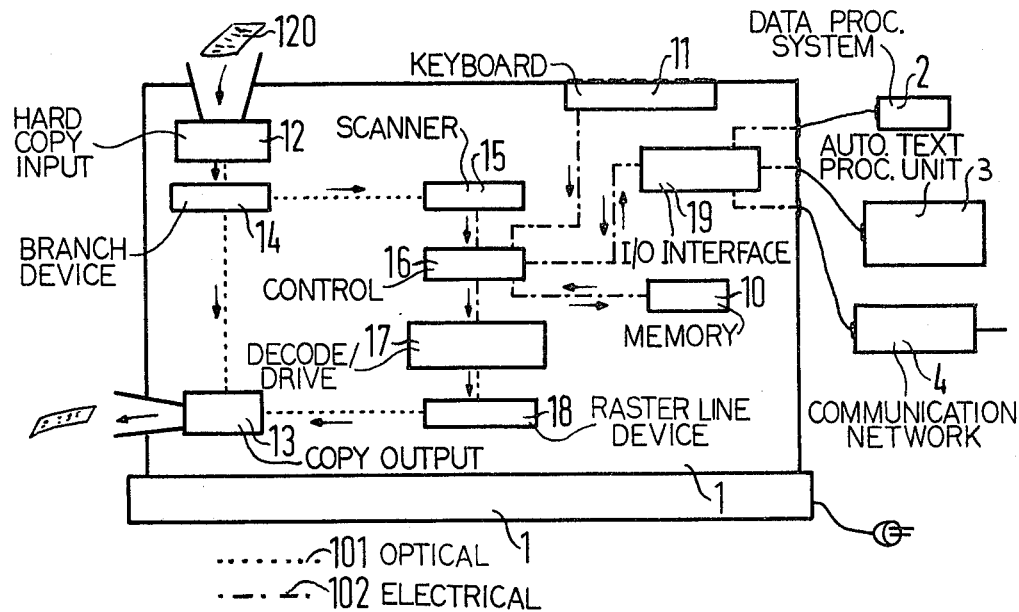
FIG. 1 is a schematic block diagram of a multipurpose terminal device constructed in accordance with the invention.

Referring first to FIG. 1, a multi-purpose terminal device 1 is illustrated as comprising a hard copy input 12 for inserting originals 120, a branching 14, a hard copy output 14 for outputting copies, a scanning device 15, a control 16, a decoder/driver device 17, a raster line device 18, an input/output interface 19, a memory 10, an input and control keyboard 11, and external devices or, respectively, installations such as a data processing system 2, an automatic text processing unit 3 and a communication network 4.

Figure 2:
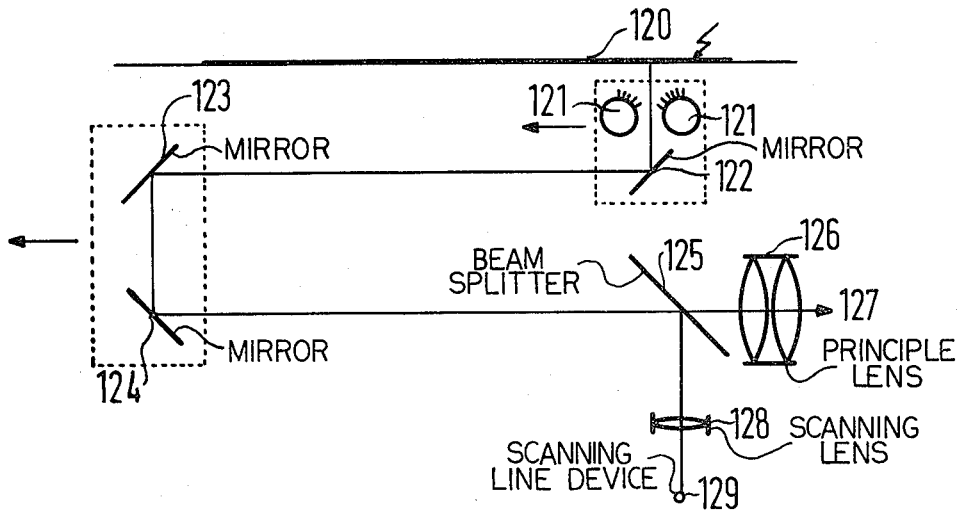
FIG. 2 is a schematic representation of the disposition of a traditional hard copy device.

FIG. 2 schematically illustrates the disposition of a traditional hard copy device having a scanning device for the copies 120 comprising lamps 121, a first mirror 122, and a carriage for compensation of the optical path, the carriage comprising a second mirror 123 and a third mirror 124, augmented in accordance with the invention by a beam divider 125, a principal lens 126 and a scanning lens 128.

FIG. 3 schematically illustrates an arrangement constructed in accordance with the invention which follows the principal lens 126 in conjunction with details already known from hard copy devices, in particular, a so-called Corotron 1272 for applying a charge to a drum 127, a mirror of the hard copy output 1271 by way of which optical information are transferred to the drum at which, as is known, a toner station 1273, a transfer station 1274, a fixing station 1276 (through which a paper supply 1275 proceeds) and a drum cleansing arrangement 1277, are disposed. In addition, FIG. 3 illustrates a raster line device 18 according to the invention.

FIG. 4 illustrates, in block diagram form, the electronics of a multi-purpose terminal device constructed in accordance with the invention, in particular, a clock generator 7, a microprocessor 8, a system controller 9, a program memory 1001, a data or buffer memory 1002, a magnetic bubble memory 1004 having an appertaining control 1003, a serial input/output interface 5 having a scanning line 129 in conjunction with a first communication interface 192, a parallel input/output interface 6 comprising an input and control keyboard 11 in conjunction with a first periphery interface 111, a raster line device 18 in conjunction with a decoder/drive electronics unit 182 and a second periphery interface 181, as well as an eight-bit parallel input/output interface 1911 in conjunction with a third periphery interface 191, whereby the devices 5, 6, 9, 1001, 1002 and 1033 can communicate with one another by way of a bus 81.

As already set forth above, FIG. 1 illustrates, in block diagram form, the electronic devices of a multi-purpose terminal device constructed in accordance with the invention. It can be seen from FIG. 1 that an input device having a hard copy input 12 is provided for inserting an original 120. A hard copy output device 13 is provided for outputting finished copies. A plurality of external devices such as a data processing system 2, an automatic text processing unit 3 and a communication network 4 can be connected. Moreover, an input and control keyboard 11 is provided which can influence an interface portion having a control 16 for controlling and monitoring electrical information paths 102 and with which the various data can be input. The external devices, in particular the data processing system 2, the automatic text processing unit 3 and the communication network 4, are connected to the multi-purpose terminal device 1 by way of an input/output interface 19. The input/output interface 19 is connected to the control 16. The control 16, moreover, is connected to a scanning device 15 and to a memory 10. Moreover, a raster line device 18 is connected to the control 16 by way of a decoder/driver device 17. The hard copy input 12 is followed over an optical information path 101 by a branching device 14 by means of which the optical information existing on the original 120 can be relayed both to the output device having the hard copy output 13 and to the scanning device 15 for further processing or, respectively, transmission of the optical information. The hard copy output 13, further, is connected by way of a further optical information path 101 to the aforementioned raster line device 18. The memory 10 serves for storing data of scanned masters, for buffering data arriving from external devices and for the intermediate storage of data during the running of processing operations.

Input originals 120 are exposed in the hard copy input 12 and are scanned in a single direction. This occurs in the manner known per se by means of a scanning carriage which includes a pair of lamps 121 and a first mirror 122, as in FIG. 2. The image is transferred by way of an optical information path to a carriage which is disposed in a manner likewise known for compensation of the optical paths. The latter carriage essentially contains a second mirror 123 and a third mirror 124 by means of which the optical information are transmitted to a beam divider 125. The beam divider 125 represents the branching device 14 illustrated in the block diagram of FIG. 1. The beam divider 125 deflects the smaller percentage of the optical energy to a scanning lens 128. The greater percentage of the optical energy is forwarded by way of a principal lens 126. During the scanning operation, the carriage with the second mirror 123 and the third mirror 124 moves forward in a known manner with half the velocity of the mirror/lamp unit having the lamps 121 and the first mirror 122. Therefore, the optical path between the master and the lens remains constant during the entire scanning process.

As can be seen from FIG. 3, the optical information transmitted by way of the principal lens 126 is transmitted directly to a mirror 1271 of the hard copy output 13 which deflects the light beam onto a drum 127 which was previously provided with a charge by means of a so-called Corotron. A light-sensitive electrostatic surface is located on the drum 127 in a known manner, the surface, due to the instant light, assuming an electrostatic charge corresponding to the instant light. Due to rotation of the drum in the direction of the arrow, as illustrated, the respectively exposed location passes through a toner station 1273 in which, usually, powder toner is attracted by the electrostatic charge. A paper supply is fed between the drum 127 and a transfer station 1274 by way of a paper feed path 1275, whereby the locations on the drum with toner adhering thereto surface transfer the toner to the paper. Subsequently, the paper passes through a fixing or stoving station 1276. The drum surface is subsequently cleansed by an arrangement comprising a cleaning ribbon 1277. As can likewise be seen in FIG. 3, there is a second possibility of exposing the drum surface, in particular, proceeding from a raster line device 18 via an additional lens arrangement.

As already set forth above and illustrated in FIG. 2, a portion of the optical energy is diverted by the beam divider 125 over a scanning lens 128. This optical connection leads to a scanning line device 129 which essentially comprises a scanning device 15, cf. FIG. 1. The scanning device 15 dissects the optical information into electrical charges representing the image points. A charge coupled device (CCD) is preferably provided for the electronic scanning. The electrical signals which have arisen in such a manner are supplied to the control 16 by way of an electrical information path 102. Here, if necessary, the signals are edited and matched to the format of the following raster line device 18 or to formats as are required for processing in the data processing system 2, the automatic text processing unit 3 or for transmission by way of the communication network 4. The control 16 offers the edited signals to a decoder/driver device 17 which, if necessary, converts the information to the output and matches the same to the raster line device 18. The raster line device 18 converts the electrical information supplied thereto into corresponding signals. Light emitting diodes (LED) in the form of a LED array are advantageously employed for the conversion of the electrical signal into the optical information. However, laser diodes in the form of a laser diode array can likewise be employed for the raster line device 18 for the conversion of the electrical signals into optical information. The light emitter diodes LED or, respectively, the laser diodes are advantageously disposed in one diode row.

For the construction of an active diode array, the diodes, together with at least the driver stages of the decoder/driver device 17, can be integrated into a block according to a hybrid method. Thereby, the individual diodes are discretely driven by a shift register which, in turn, is driven by an externally supplied clock. Such a block is executed in such a manner that it is easy to replace.

A further possibility for constructing the raster line device is that the light emitting diodes LED or, respectively, the laser diodes are disposed in a diode row in such a manner that the individual diodes of the row may be driven in accordance with a time-division multiplex technique which is known per se.

The necessary driver stages are designed in such a manner that fluctuations of light intensity within the array can be compensated by a control current.

The resolution required in office communications can be achieved in two manners. For example, four raster lines with a low resolution, for example, two points/mm, are disposed parallel to one another whereby the image of the raster line parallel arrangement arising in such a manner is reduced by way of a lens so that a single line can be imaged onto the drum 127 with increased resolution. For the purpose of a further improvement of resolution, a parallel arrangement of diode rows having an increased plurality of diodes/mm, for example, eight, is provided. The decoder/driver device required for this purpose is integrated together with the parallel arrangement and a reducing lens into a single module.

The optical information obtained from the electrical signals in the raster line device 18 is supplied by way of a further optical information path to the hard copy output 13, cf. FIG. 3.

The interface portion, cf. FIG. 4, contains a microprocessor 8 as well as accommodation connections 5, 6 for the input and output of data, a program memory 1001, a data or buffer memory of smaller capacity 1002 and, respectively, a data or buffer memory of greater capacity 1003. The program memory 1001 is advantageously executed as a read only memory (ROM). The data or buffer memory, insofar as a relatively small memory capacity is required, is executed as a random access memory RAM 1002. In the case the data or buffer memory requires a relatively large memory capacity, a magnetic bubble memory 1004 and a control 1003 for the bubble memory are provided.

A clock 7 and a system controller 9 are provided at the microprocessor 8. A serial input/output interface 5 having a line scanning device 129 in conjunction with a first communication interface 192 and a further serial input/output interface 1931 in conjunction with a second communication interface 193 are further provided. A parallel input/output interface 6 comprises the input and control keyboard 11 in conjunction with a first periphery interface 111, the raster line device 18 in conjunction with a decoder/driver device 182, a second periphery interface 181, and eight-bit parallel input/output interface 1911 in conjunction with a third periphery interface 191. The devices 5, 6, 9, 1001, 1002 and 1003 can communicate with one another in a known manner by way of a bus 81. The manufacturer designations of the circuits employed are entered on the blocks representing the subunits.

When producing a local copy, as mentioned above, the optical information of the original 120 is reflected after the beam divider 125 to the mirror 1271 of the hard copy output 13 and is transmitted to the drum 127. Thereby, the raster line device 18 is shut off. When producing a raster copy, the raster line device 18 is supplied with electrical signals proceeding from the control 16, whereby the optical information path 101 between the principal lens 126, following the beam divider 125, and the drum 127 is blocked or the hard copy input 12 is shut off.

The signals which exist for producing a local copy when an original 120 is scanned can first be inscribed in the memory 10, cf. FIG. 1, and can be read at a later time for producing the local copy so that no mechanical blocking of the optical information path is required when producing a rastered copy. In order to superimpose the optical information of two or more originals 120, the originals are successively scanned. The respectively arising scanning signals are inscribed in the memory 10 and are then superimposed on one another. The signals superimposed in such a manner are read for producing the local copy.

For the purpose of selective cancellation of portions of the scanning signals inscribed in the memory 10, a "cancel pattern" consisting of corresponding signals is inscribed in the memory 10 via the input and control keyboard 11, whereby the "cancel pattern" consists of "black" fields at those locations of the stored master to be canceled and whereby the information content of the master is translated with the assistance of the control 16 in such a manner that the appertaining information is canceled.

Text encoded by the data processing system 2 or by the automatic text processing unit 3 are inscribed page-by-page into the memory 10 and are subsequently printed out via the raster line device 18. Additional information, such as the date, page number, file number or the like, are directly input via the input and control keyboard 11 and are subsequently printed.

For the purpose of an outgoing transmission of a facsimile master, its optical content is first scanned. The scanning signals arising are inscribed into the memory 10. The appertaining memory content is then forwarded at a later time for the communication network 4 via the input/output interface 19.

For the purpose of an incoming transmission of a facsimile master, the signals corresponding to its optical content are forwarded from the communication network 4 to the input/output interface 19. The signals are adapted there and inscribed into the memory 10 from which they are read out at a later time for print out.

In order to check whether the quality of the rastered document is still sufficient given a master in case it is to be transmitted as a telecopy, a rastered local copy can advantageously be produced, its data being simultaneously deposited in the memory 10. If the visual check shows that the quality is sufficient, a corresponding command for transmitting the stored signals via the communication network 4 can be given by way of the input and control keyboard 11.

The employment of a CCD in the raster line device 18 for dissecting the optical information is advantageous because the light sensitivity of such a CCD is significantly higher than that of a xerographic drum. Therefore, it suffices entirely to drive the raster line device 18 with only a fraction of the light available for the copying operation. Therefore, there is the possibility of simultaneously undertaking the electronic scanning and the local copy with the assistance of the beam divider 125. This is advantageous, for example, when a telecopy and a local copy are to be produced simultaneously from one document.

Although we have described our invention by reference to particular embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A multi-purpose terminal device for connection of external devices including a data processing system, an automatic text processing unit and a communication network, comprising:
   a hard copy input device for receiving and optically scanning an original to produce optical information and transmit the same over a first optical path;
   a branching device in the first optical path for passing a first portion of the optical energy along the first optical path and branching a second portion of the optical energy along a second optical path;
   a copy output device coupled to the first optical path and operable in response to the first portion of the optical energy to produce a hard copy of the original;
   a keyboard operable to produce a plurality of command signals; and
   interface means for coupling the external devices to said branching device over the second optical path and to said copy output device over a third optical path, said interface means including an interface device for connection to the external devices, an electrical signal generator coupled to the second optical path, an optical signal generator coupled to the third optical path and operable in response to input signals to transmit optical energy to operate said copy output device, and a memory for storing information, said interface means further including control means responsive to command signals to selectively interconnect via said interface device, the external devices with said electrical signal generator for transmitting outgoing information and with said optical signal generator for receiving incoming information and to selectively connect the external devices and said electrical signal generator to said memory for temporary storage of the respective incoming and outgoing information.

2. The terminal device of claim 1, wherein:
   said optical signal generator comprises:
   a driver/decoder device connected to said interface device via said control means to receive and decode incoming information into electrical signals; and
   a raster line device coupled to said copy output device over the third optical path and connected to and driven by said decoder/driver device to transmit optical signals for causing said copy output device to produce a corresponding hard copy.

3. The terminal device of claim 2, wherein:
   said raster line device has a predetermined format and said decoder/driver device includes means for adapting the incoming information to said predetermined format.

4. The terminal device of claim 3, wherein said raster line device comprises:
   a plurality of light-emitting diodes arranged in an array.

5. The terminal device of claim 3, wherein said raster line device comprises:
   a plurality of laser diodes arranged in an array.

6. The terminal device of claim 3, wherein said raster line device comprises:
   a plurality of diodes arranged in a row; and
   said decoder/driver device comprises:
   driver stages connected to and hybrid integrated with said diodes to form an easily replaceable unit.

7. The terminal device of claim 3, wherein said raster line device comprises:
   a plurality of light-emitting diodes arranged in a row; and
   said decoder/driver device comprises:
   driver stages connected to and hybrid integrated with said diodes to form an easily replaceable unit.

8. The terminal device of claim 3, wherein said raster line device comprises:
   a plurality of laser diodes arranged in a row; and
   said decoder/driver device comprises:
   driver stages connected to and hybrid integrated with said diodes to form an easily replaceable unit.

9. The terminal device of claim 3, wherein said raster line device comprises:
   a plurality of diodes arranged in a row; and
   said decoder/driver device comprises:
   driver means connected to and operable to drive said diodes on a time-division multiplex basis.

10. The terminal device of claim 3, wherein:
    said raster line device comprises:
    a plurality of light-producing diodes disposed in a predetermined arrangement; and
    said decoder/driver device comprises:
    current-controlled driving means for driving and controlling light intensity fluctuations of said diodes.

11. The terminal device of claim 3, wherein said raster line device comprises:
    a plurality of diodes arranged in a first predetermined number of parallel lines and with a second predetermined number of diodes per unit of line length providing a first resolution; and
    a lens optically coupled to said diodes for reducing the parallel raster line arrangement to a single line of a second, increased resolution.

12. The terminal device of claim 11, wherein said first predetermined number is four and said second predetermined number is two per millimeter.

13. The terminal device of claim 11, wherein said second predetermined number is eight per millimeter.

14. The terminal device of claim 13, wherein said decoder/driver device is integrated with said diodes as a single unit.

15. The terminal device of claim 1, wherein:
    said hard copy input device comprises means for scanning the original in one dimension; and
    said electrical signal generator comprises a scanner for converting the second portion of the optical energy into electrical signals representing image points.

16. A multi-purpose terminal device for connection to external devices including a data processing system, an automatic text processing unit, and a communication network, comprising:
    a hard copy input device for receiving and optically scanning an original along one dimension to produce optical information signals and transmit the same over a first optical path;
    a branching device comprising a beam splitter in the first optical path for passing a first portion of the optical energy of the optical information signals along the first optical path and deflecting a smaller, second portion of the optical energy along a second path;

a hard copy output device coupled to the first optical path and operable in response to optical information signals to produce a representative hard copy;

a keyboard for generating a plurality of command signals for controlling the transmission directions of electrical and optical signals; and interface means for operatively interconnecting the external devices with said branching device over the second optical path and with said hard copy output device over a third optical path, said interface means including an interface device for connection to the external devices, an electrical signal generator including a scanner for converting the second portion of the optical energy into electrical signals representing image points, an optical signal generator including a raster line device coupled to said hard copy output device over the third optical path and a driver/decoder device connected to said raster line device for driving the same in response to electrical signals, a memory for storing information, and control means connected to said keyboard, to said interface device, to said memory, to said optical signal generator and to said electrical signal generator, said control means operable in response to respective command signals to selectively interconnect the external devices, said scanner, said decoder/driver device and said memory for, respectively, transmitting outgoing information, receiving incoming information and temporarily storing information.

17. The terminal device of claim 16, wherein:
said scanner comprises a charge-coupled device.

18. A multi-purpose terminal device for connection of external devices including a data processing system, an automatic text processing unit and a communication network, comprising:

a hard copy input device for receiving an optically scanning an original to produce optical information and transmit the same over a first optical path;

a branching device in the first optical path for passing a first portion of the optical energy along the first optical path and branching a second portion of the optical energy along a second optical path;

a copy output device coupled to the first optical path and operable in response to the first portion of the optical energy to produce a hard copy of the original;

a keyboard operable to produce a plurality of command signals; and interface means for coupling the external devices to said branching device over the second optical path and to said copy output device over a third optical path, said interface means including a microprocessor, a program memory, an interface device including serial and parallel input/output connections for connection to the external devices, an electrical signal generator coupled to the second optical path, an optical signal generator coupled to the third optical path and operable in response to input signals to transmit optical energy to operate said copy output device, and memory means including a first memory of a first capacity and a second memory of a larger, second capacity for storing information, said interface means further including control means responsive to command signals to selectively interconnect via said interface device, the external devices with said electrical signal generator for transmitting outgoing information and with said optical signal generator for receiving incoming information and to selectively connect the external devices and said electrical signal generator to said memory means for temporary storage of the respective incoming and outgoing information.

19. The terminal device of claim 18, wherein:
said program memory is a read-only memory.

20. The terminal device of claim 18, wherein:
said first memory is a random access memory.

21. The terminal device of claim 18, wherein:
said first memory is a magnetic bubble memory with a magnetic bubble memory control.

22. A multi-purpose terminal device for connection to external devices including a data processing system, an automatic text processing unit, and a communication network, comprising:

a hard copy input device for receiving and optically scanning an original along one dimension to produce optical information signals and transmit the same over a first optical path;

a branching device comprising a beam splitter in the first optical path for passing a first portion of the optical energy of the optical information signals along the first optical path and deflecting a smaller, second portion of the optical energy along a second path;

a hard copy output device coupled to the first optical path and operable in response to optical information signals to produce a representative hard copy;

a keyboard for generating a plurality of command signals for controlling the transmission directions of electrical and optical signals;

interface means for operatively interconnecting the external devices with said branching device over the second optical path and with said hard copy output device over a third optical path, said interface means including an interface device for connection to the external devices, an electrical signal generator including a scanner for converting the second portion of the optical energy into electrical signals representing image points, an optical signal generator including a raster line device coupled to said hard copy output device over the third optical path and a driver/decoder device connected to said raster line device for driving the same in response to electrical signals, said raster line device including a plurality of light producing diodes in a predetermined number of parallel lines with a predetermined number of diodes per unit of time length and a lens for imaging the parallel lines of diodes as a single line, a memory for storing information, and control means connected to said keyboard, to said interface device, to said memory, to said optical signal generator and to said electrical signal generator, said control means operable in response to respective command signals to selectively interconnect the external devices, said scanner, said decoder/driver device and said memory for, respectively, transmitting outgoing information, receiving incoming information, and temporarily storing information;

said hard copy output device including
- a rotatable electrostatically-chargeable drum optically coupled to said raster line device, and a deflecting mirror coupling said drum to said first optical path; and said control means includes means for selectively blocking said hard copy input device and said raster line device.

23. The terminal device of claim 22, wherein:
said control means includes means for interconnecting said scanner and said memory for storage of the electrical signals generated so that mechanical blockage of the optical information is obviated in producing a rastered copy.

24. The terminal device of claim 23, wherein:
said interface means comprises first means for storing signals of an optically scanned first original and storing superposed thereon signals of an optically scanned second original in said memory; and
means for reading the superposed signals for producing a copy having superposed information.

25. The terminal device of claim 24, wherein:
said interface means comprises means responsive to a cancel pattern command signal from said keyboard to effectively cancel corresponding information read from said memory.

* * * * *